US012257841B2

(12) United States Patent
Ochi et al.

(10) Patent No.: US 12,257,841 B2
(45) Date of Patent: Mar. 25, 2025

(54) WATER-REPELLENT MEMBER, INKJET HEAD, METHOD OF MANUFACTURING WATER-REPELLENT MEMBER, AND METHOD OF MANUFACTURING INKJET HEAD

(71) Applicant: CANON KABUSHIKI KAISHA, Tokyo (JP)

(72) Inventors: Norihiko Ochi, Kanagawa (JP); Junri Ishikura, Tokyo (JP); Koji Sasaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 18/145,368

(22) Filed: Dec. 22, 2022

(65) Prior Publication Data

US 2023/0219342 A1 Jul. 13, 2023

(30) Foreign Application Priority Data

Jan. 12, 2022 (JP) ................................ 2022-002834

(51) Int. Cl.
*B41J 2/14* (2006.01)
*B41J 2/16* (2006.01)

(52) U.S. Cl.
CPC ............ *B41J 2/1433* (2013.01); *B41J 2/164* (2013.01)

(58) Field of Classification Search
CPC ................................ B41J 2/1433; B41J 2/164
See application file for complete search history.

(56) References Cited

U.S. PATENT DOCUMENTS

| | | | | |
|---|---|---|---|---|
| 2003/0056721 | A1* | 3/2003 | Yamamoto | B41J 2/1606 118/20 |
| 2015/0077470 | A1* | 3/2015 | Sawada | C08G 77/24 347/45 |
| 2017/0022607 | A1 | 1/2017 | Shibusawa | |

FOREIGN PATENT DOCUMENTS

| | | | |
|---|---|---|---|
| JP | 2000-229410 | A | 8/2000 |
| JP | 2002-127429 | A | 5/2002 |
| JP | 2008-213201 | A | 9/2008 |
| JP | 2012-166366 | A | 9/2012 |
| JP | 2017-35812 | A | 2/2017 |
| WO | 2018/186159 | A1 | 10/2018 |

* cited by examiner

*Primary Examiner* — Jason S Uhlenhake
(74) *Attorney, Agent, or Firm* — Venable LLP

(57) ABSTRACT

A water-repellent member includes a base layer formed on the substrate, projections dispersedly arranged on the base layer, a first water-repellent material provided on the base layer in contact with the base layer, and a second water-repellent material provided on the projections in contact with the projections. The first water-repellent material and the second water-repellent material are perfluoropolyether compounds. An oxygen concentration of the base layer is lower than an oxygen concentration of the projections.

19 Claims, 6 Drawing Sheets

PRIOR ART

WATER-REPELLENT MEMBER, INKJET HEAD, METHOD OF MANUFACTURING WATER-REPELLENT MEMBER, AND METHOD OF MANUFACTURING INKJET HEAD

BACKGROUND OF THE INVENTION

Field of the Invention

The present invention relates to a water-repellent member and an inkjet head including the water-repellent member.

Description of the Related Art

As a device for ejecting an ink (hereinafter, referred to as an inkjet head), a bubble jet (registered trademark) that causes droplets to fly by instantaneously vaporizing an ink using a heater, a piezo jet that energizes droplets using a piezoelectric element, and the like are known. In order to perform high-quality image recording using the inkjet head, ink droplets are required to be ejected through an ink ejection port in a predetermined direction with excellent straightness. However, in a case where residues of the droplets adhere to an orifice plate surface around the ejection port, when the ink droplets are ejected, the ink droplets are dragged into the residues, such that an ejection direction may be oblique and the ink droplets may fly in a direction deviated from the predetermined direction. Therefore, in order to suppress adhesion of the droplet residues around the ink ejection port, a water-repellent film is provided around the ink ejection port.

JP 2002-127429 A discloses a method of manufacturing an inkjet head, the method including: forming a protective member; and removing the protective member, in order to prevent damage to a water-repellent film and clogging in an ejection port in manufacturing the inkjet head.

On the other hand, in the inkjet head, in order to remove paper dust, contaminants, and the like, cleaning of a head surface using a wiper is generally performed. However, when a cleaning operation is performed using the wiper, the water-repellent film may be peeled off. Since the method described in JP 2002-127429 A is a technique for suppressing damage to the water-repellent film in manufacturing the inkjet head, the peeling of the water-repellent film in the cleaning operation using the wiper cannot be solved.

JP 2000-229410 A discloses a water-repellent structure in which a regularly laid out uneven structure having an etching depth of 10 μm or less is formed on a substrate by using a photolithography method, and a water-repellent film is formed on a surface of the uneven structure. As described in JP 2000-229410 A, when the water-repellent film is provided on the fine and regular uneven structure, adhesion between the water-repellent film and the base is improved, and there is a possibility that film peeling (dropping of the film from the substrate) during wiping can be reduced.

However, in the structure described in JP 2000-229410 A, even when the film is not peeled off (dropping of the film from the substrate), consumption (wear) of the water-repellent film due to sliding tends to occur locally and intensively on a convex portion. This is because, at the time of wiping, a contact load of the wiper is concentrated on a portion of the water-repellent film formed on a convex portion. When the wiping is repeated, the water-repellent film is consumed at an early stage on the convex portion which is likely to come into contact with the droplets, a period during which the initial water-repellent performance can be maintained is shortened, and an effective life of the inkjet head is shortened. Therefore, in a case of a head-replaceable inkjet ejection apparatus, a replacement cycle of the head is shortened, and in a case of a head-fixed inkjet ejection apparatus, a life of the apparatus itself is shortened.

Therefore, in the field of the inkjet head, it has been expected to realize a water-repellent member capable of maintaining a water-repellent performance for a long period of time even when wiping is performed.

SUMMARY OF THE INVENTION

According to a first aspect of the present invention, a water-repellent member includes a base layer formed on the substrate, projections dispersedly arranged on the base layer, a first water-repellent material provided on the base layer so as to be in contact with the base layer, and a second water-repellent material provided on the projections so as to be in contact with the projections. The first water-repellent material and the second water-repellent material are perfluoropolyether compounds. An oxygen concentration of the base layer is lower than an oxygen concentration of the projections.

According to a second aspect of the present invention, an inkjet head includes an orifice plate provided with an ejection port. The orifice plate includes a substrate, a base layer formed on the substrate, projections dispersedly arranged on the base layer, a first water-repellent material provided on the base layer so as to be in contact with the base layer, and a second water-repellent material provided on the projections so as to be in contact with the projections. The first water-repellent material and the second water-repellent material are perfluoropolyether compounds. An oxygen concentration of the base layer is lower than an oxygen concentration of the projections.

According to a third aspect of the present invention, a method of manufacturing a water-repellent member includes forming a base layer on a substrate, dispersedly arranging projections having an oxygen concentration higher than that of the base layer on the base layer, and forming a water-repellent film that contains a perfluoropolyether compound and is in contact with the base layer and the projections.

Further features of the present invention will become apparent from the following description of exemplary embodiments with reference to the attached drawings.

DESCRIPTION OF THE EMBODIMENTS

Figure 1:
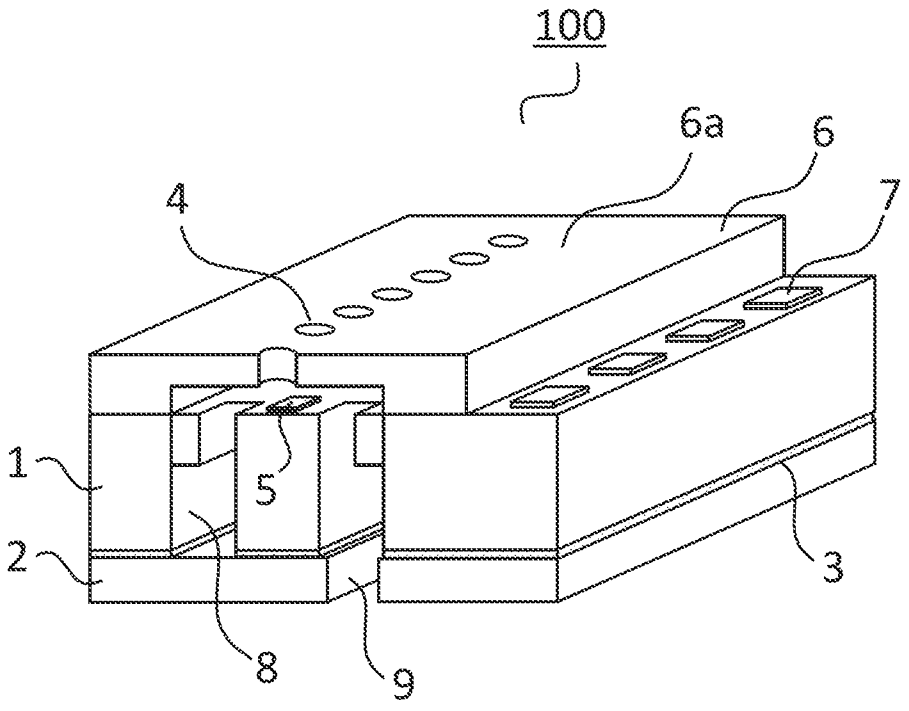
FIG. 1 is a perspective view illustrating an appearance of an inkjet head which is an example of an exemplary embodiment.

A water-repellent member, an inkjet head, and the like according to exemplary embodiments of the present invention will be described with reference to the drawings.

Note that exemplary embodiments described below are examples, and for example, detailed configurations can be appropriately changed and implemented by those skilled in the art without departing from the gist of the present invention.

Note that in the drawings referred to in the following exemplary embodiments and examples, elements denoted by the same reference numerals have the same functions unless otherwise specified.

Inkjet Head

FIG. 1 is a perspective view illustrating an appearance of an inkjet head which is an example of an exemplary embodiment of the present invention. An inkjet head 100 includes a first flow path substrate 1, a second flow path substrate 2, an adhesive 3, an ejection port 4, an ejection energy generating element 5, an orifice plate 6 having an orifice surface 6*a*, and an electrode 7. Note that among the constituent components of the inkjet head, components (for example, a wiring and the like) which are not directly related to the description of the present invention are not illustrated.

The first flow path substrate 1 and the second flow path substrate 2, and the first flow path substrate 1 and the orifice plate 6 are joined and integrated via the adhesive 3 to form a flow path structure. In the flow path structure, a first through flow path 8 and a second through flow path 9 are formed, and these through flow paths communicate with each other to form an ink supply path. Note that only a part of the adhesive 3 is illustrated in FIG. 1 for convenience of illustration.

Although a plurality of ejection ports 4 are arranged in a line in the orifice plate 6, an arrangement method (number or position) of the ejection ports 4 is not limited to the example of FIG. 1. As described below, a water-repellent structure according to the present invention is formed on an outer surface of the orifice plate 6 existing around the ejection ports 4, that is, the orifice surface 6*a*. Therefore, the orifice plate 6 can also be referred to as a water-repellent member.

The ejection energy generating element 5 for ejecting a liquid is provided on the first flow path substrate 1 at a position corresponding to each of the ejection ports 4, and the ejection energy generating element 5 is driven according to an electric signal transmitted from the outside via the electrode 7. As the ejection energy generating element 5, for example, an electrothermal conversion element or a piezoelectric element is preferably used.

The liquid to be ejected is supplied from an ink tank (not illustrated) through the second through flow path 9 and the first through flow path 8, and is ejected through the ejection ports 4 by applying ejection energy generated by the ejection energy generating element 5.

Water-Repellent Member

Figure 2A:
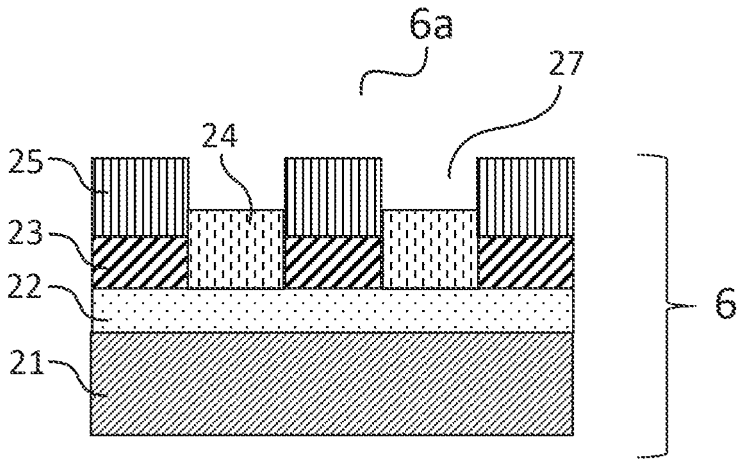
FIG. 2A is a schematic cross-sectional view schematically illustrating an enlarged partial cross section of an orifice plate according to an exemplary embodiment.

The water-repellent structure formed on the outer surface of the orifice plate 6 which is a water-repellent member will be described. FIG. 2A is a schematic cross-sectional view schematically illustrating an enlarged partial cross section of the orifice plate 6. Note that since the drawings are schematically illustrated for convenience of description, the shapes and dimensional relationships of the respective portions do not necessarily represent actual objects. The orifice plate 6 includes a substrate 21, a base layer 22, a projection 23, a first water-repellent material 24, and a second water-repellent material 25.

The substrate 21 has required mechanical strength and is formed of a material suitable for forming the ejection port 4 or the water-repellent structure. For example, silicon, a metal material, a resin material, an inorganic material other than silicon, an inorganic oxide material, or a material obtained by combining these materials is preferably used.

The base layer 22 provided on the substrate 21 is formed as a base of the water-repellent material 24 and the projection 23. In the example of FIG. 2A, the base layer 22 is directly formed on the substrate 21, but a protective film for protecting the substrate 21 from being corroded by the ink or an adhesive layer for improving adhesion of the base layer 22 may be interposed between the base layer 22 and the substrate 21.

A plurality of minute projections 23 are dispersedly arranged on the base layer 22. The projections 23 are convex portions formed on the flat base layer 22, and may be regularly arranged as illustrated, but may be irregularly arranged like a naturally formed island.

When the water-repellent material is formed, the base layer 22 functions as a base when the first water-repellent material 24 is formed, and the projection 23 functions as a base when the second water-repellent material 25 is formed. As described below, the projection 23 is formed of a material having physical properties (oxygen content concentration) different from those of the base layer 22. Due to the difference in physical properties, the first water-repellent material 24 formed on the base layer 22 and the second water-repellent material 25 formed on the projection 23 are water-repellent materials having different physical properties (degree of roughness). As described above, in the present exemplary embodiment, the water-repellent structure is formed so that the first water-repellent material constituting a bottom surface of the concave portion and the second water-repellent material constituting the convex portion have different physical properties (degree of roughness), instead of uniformly covering the irregularities of the substrate with the water-repellent film as in JP 2000-229410 A.

As the material of the base layer 22, a material having a relatively lower oxygen content concentration than the material of the projection 23 is used. An oxygen concentration of the base layer 22 is 10 at % or more and 50 at % or less in energy dispersive X-ray analysis. The main component of the base layer 22 is appropriately selected from, for example, oxide materials such as silicon oxide, silicon carbide, zirconia, alumina, titania, hafnia, tantalum oxide, cerium oxide, tungsten oxide, niobium oxide, tantalum oxide, and yttrium oxide, and mixed oxide materials such as indium tin oxide and strontium ruthenium oxide.

The base layer 22 can be formed by an appropriate film forming method selected from dry film forming methods such as a sputtering method, a vacuum deposition method, an atomic layer deposition (ALD) method, a gas deposition method, a chemical vapor deposition (CVD) method, and a thermal spray method, and wet film forming methods such as a slit coating method, a transfer method, a spin coating method, and a dip coating method. In particular, a film forming method capable of easily controlling the oxygen content of the base layer 22 to be formed is preferable, and a sputtering method or a vacuum deposition method is preferably used.

As the material of the projection 23, a material having a relatively higher oxygen content concentration than the material of the base layer 22 is used. An oxygen concentration of the projection 23 is preferably higher than that of the material of the base layer 22 by 10 at % or more in energy dispersive X-ray analysis. The main component of the projection 23 is appropriately selected from, for example, oxide materials such as silicon oxide, silicon carbide, zirconia, alumina, titania, hafnia, tantalum oxide, cerium oxide, tungsten oxide, niobium oxide, tantalum oxide, and yttrium oxide, and mixed oxide materials such as indium tin oxide and strontium ruthenium oxide.

The projection 23 can be formed by an appropriate film forming method selected from dry film forming methods such as a sputtering method, a vacuum deposition method, an atomic layer deposition (ALD) method, a gas deposition method, a chemical vapor deposition (CVD) method, and a thermal spray method, and wet film forming methods such as a slit coating method, a transfer method, a spin coating method, and a dip coating method. In particular, a film forming method capable of easily controlling the oxygen content of the projection 23 to be formed is preferable, and a sputtering method or a vacuum deposition method is preferably used. The projections 23 may have, for example, an island structure (irregular arrangement) formed at an initial stage after the start of film formation in vacuum film formation, or may have a predetermined pattern (regular arrangement) formed by mask deposition or photolithographic etching.

The base layer 22 and the projection 23 form a base irregularity structure that functions as a base when the water-repellent film is formed. The water-repellent film includes the first water-repellent material 24 and the second water-repellent material 25 formed adjacent to each other on the base irregularity structure. A surface of the water-repellent film including the first water-repellent material 24 and the second water-repellent material 25 is an uneven surface reflecting a shape of the base irregularity structure.

A plurality of concave portions 27 are formed on the uneven surface of the water-repellent film, a bottom surface of the concave portion 27 is defined by the first water-repellent material 24, and a side surface of the concave portion 27 is defined by the second water-repellent material 25. A surface surrounding the concave portion 27 (the tip of the uneven surface) is defined by the second water-repellent material 25.

Figure 2B:
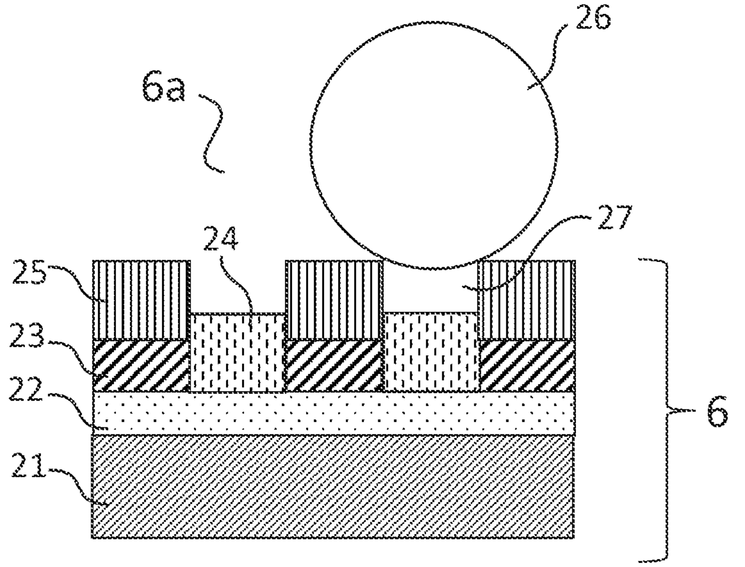
FIG. 2B is a view illustrating a state in which droplets are in contact with the orifice plate according to an exemplary embodiment.

As schematically illustrated in FIG. 2B, when a liquid 26 (ink) comes into contact with the orifice surface 6*a*, the concave portion 27 functions as an air reservoir. When the concave portions 27 are provided as described above, an area where the liquid 26 (ink) comes into contact with the orifice surface 6*a* is reduced, such that water repellency is facilitated, and adhesion is difficult. That is, the water-repellent performance of the orifice surface 6*a* can be enhanced by forming the orifice surface 6*a* using a material having a large contact angle and providing the minute concave portions 27. Note that FIG. 2B is a schematic view illustrating a state in which the liquid 26 (ink) is supported by the convex portions (second water-repellent materials 25) formed on both sides surrounding one concave portion. However, in a case where a size of the liquid 26 (ink) is large, the liquid is interposed between the plurality of concave portions 27 serving as an air reservoir separating the liquid surface and the orifice surface 6*a*.

In the present exemplary embodiment, materials having a high water-repellent performance are used for the first water-repellent material 24 and the second water-repellent material 25 constituting the water-repellent film, but a water-repellent material on which a film having different physical properties (degree of roughness) depending on the physical properties (oxygen content concentration) of the base material is formed is used.

That is, a water-repellent material is used so that a film having a low density (sparse) is formed when the oxygen content concentration of the base material is low, and a film having a high density (dense) is formed when the oxygen content concentration of the base material is high.

Specifically, as the materials of the first water-repellent material 24 and the second water-repellent material 25, a fluorine-based water-repellent material is used, and in particular, a perfluoropolyether compound is preferably used. Since the perfluoropolyether compound is bonded to the base via oxygen, a dense film having a larger bonding amount with the base layer can be formed as the oxygen concentration contained in the base layer is higher. In order to realize a difference in roughness depending on a location of the perfluoropolyether compound, the oxygen concentration of the projection 23 is desirably higher than that of the material of the base layer 22 by 10 at % or more in the energy dispersive X-ray analysis.

The fluorine-based water-repellent material preferably used in the present exemplary embodiment is a perfluoropolyether compound having at least one of repeating structures represented by the following Structural Formulas (1) to (4).

[Structural Formula (1)]

$$-\left[CF_2-CF_2-CF_2-O\right]_{n1}- \quad (1)$$

[Structural Formula (2)]

$$-\left[\overset{\overset{\displaystyle CF_3}{|}}{C}F-CF_2-O\right]_{n2}- \quad (2)$$

[Structural Formula (3)]

$$-\left[CF_2-O\right]_{n3}- \quad (3)$$

[Structural Formula (4)]

$$-\left[CF_2-CF_2-O\right]_{n4}- \quad (4)$$

An example of the perfluoropolyether compound that can be used in the present exemplary embodiment is represented by the following Chemical Formula 5.

[Structural Formula (5)]

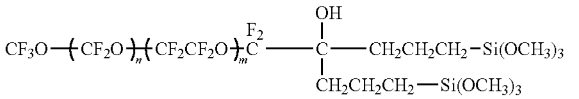

Note that a ratio of a $CF_2O$ unit to a $CF_2CF_2O$ unit determined from an integral value of a $^{19}$NMR spectrum is n:m=27:26. In addition, a molecular weight of a perfluoropolyether moiety calculated from the number of units is about 5,000.

In addition, a general formula of the perfluoropolyether compound that can be used in the exemplary embodiment is represented by the following structural formula.

[Structural Formula (6)]

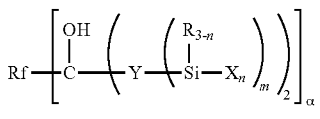

Here, Y is a 2- to 6-valent hydrocarbon group which may have a siloxane bond or a silylene group, R's are independently an alkyl group having 1 to 4 carbon atoms or a phenyl group, X's are independently a hydrolyzable group, n is an integer of 1 to 3, m is an integer of 1 to 5, and $\alpha$ is 1 or 2.

Note that Rf is represented by the following Chemical Formula 7.

[Structural Formula (7)]

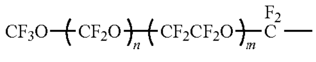

In the present exemplary embodiment, as described above, the base layer 22 is formed of a material having a lower oxygen content concentration than the projection 23. Therefore, the first water-repellent material 24 formed on the base layer 22 is less bonded to the base and has a lower density than the second water-repellent material 25 formed on the projection 23. In other words, the second water-repellent material 25 is formed more densely than the first water-repellent material 24.

In the exemplary embodiment, since the second water-repellent material 25 is formed more densely than the first water-repellent material 24, the concave portion 27 that functions as an air reservoir can be maintained for a long period of time even when the orifice surface 6*a* is cleaned with a wiper.

Figure 3A:
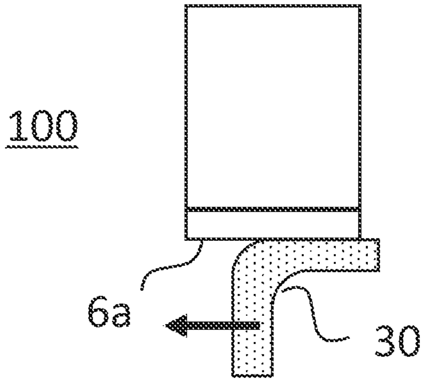
FIG. 3A is a view illustrating an example of a cleaning operation using a wiper.
Figure 3B:
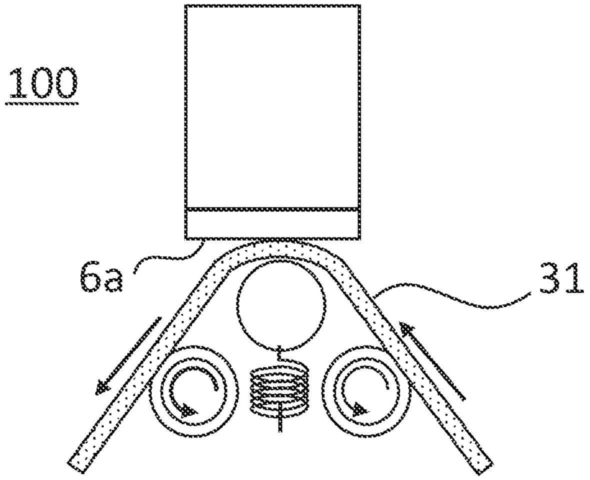
FIG. 3B is a view illustrating another example of a cleaning operation using a wiper.

A typical aspect of the cleaning operation using the wiper will be described with reference to FIGS. 3A, 3B, and 4. FIG. 3A schematically illustrates a state of cleaning the orifice surface 6*a* by moving a wipe member 30 in a direction of the arrow in the drawing while bringing the wipe member 30 into contact with the orifice surface 6*a* of the inkjet head 100. The wipe member 30 is formed of, for example, an elastic body such as rubber or sponge, and is configured to slide while pressing the orifice surface 6*a* with an appropriate pressure by a drive mechanism (not illustrated). As another example, FIG. 3B schematically illustrates a state of cleaning the orifice surface 6*a* by moving a belt-shaped wipe member 31 in the direction of the arrow in the drawing while bringing the wipe member 31 into contact with the orifice surface 6*a* of the inkjet head 100. The wipe member 31 is formed of, for example, an elastic body such as non-woven fabric or felt, and is configured to be slidable while pressing the orifice surface 6*a* with an appropriate pressure.

Figure 4:
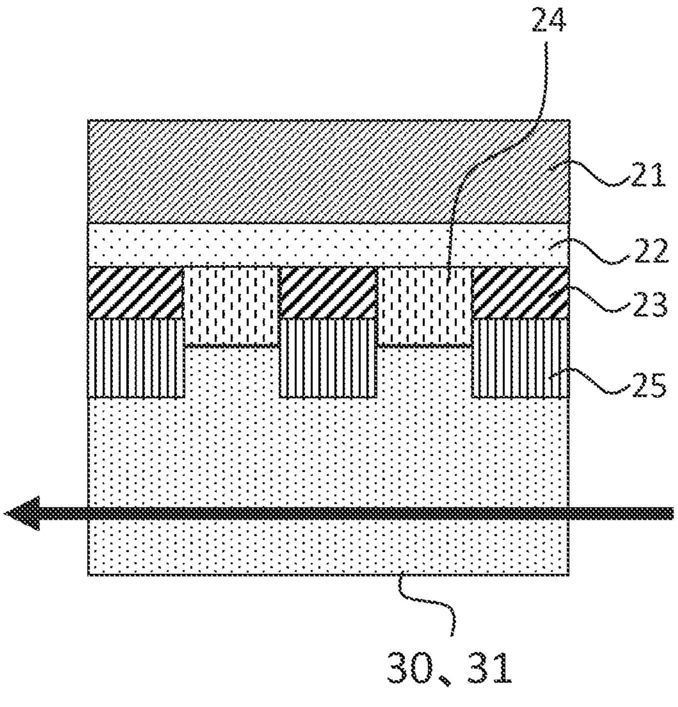
FIG. 4 is a schematic enlarged view for explaining sliding of a wipe member.

As schematically illustrated in FIG. 4, when the orifice surface 6*a* is wiped while being pressed using the wipe member formed of an elastic body, the wipe member is elastically deformed and slides while being in contact with both the first water-repellent material 24 and the second water-repellent material 25. In this case, a larger resistance force acts on the protruding second water-repellent material 25 than on the first water-repellent material 24 at the bottom of the concave portion. When the cleaning operation is repeatedly performed as the inkjet head 100 is used, the water-repellent film is gradually consumed (worn) by sliding with the wipe member.

Figure 6A:
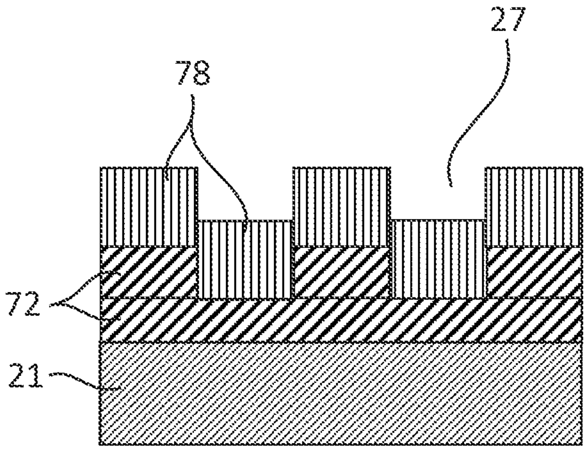
FIG. 6A is a schematic view of a water-repellent structure according to the related art in which a water-repellent film having homogeneous physical properties is formed on a base having irregularities.
Figure 6B:
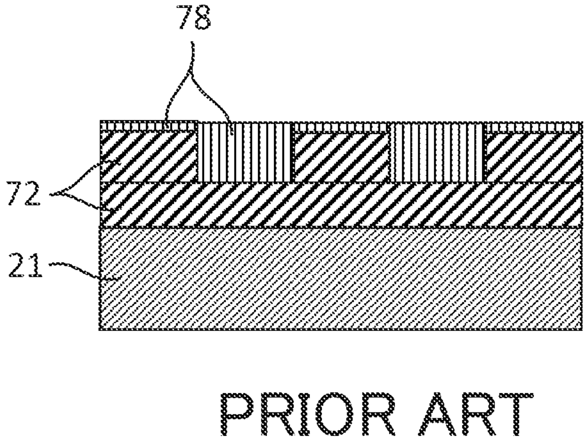
PRIOR ART FIG.6B
FIG. 6B is a schematic view of the water-repellent structure according to the related art in which a convex portion is consumed (worn) by a cleaning operation using a wiper.

As illustrated in FIG. 6A, in a case of an inkjet head in which a water-repellent film 78 having homogeneous physical properties is coated on a base 72 having irregularities, consumption (wear) due to sliding with the wipe member locally and intensively occurs at a convex portion of the water-repellent film on which large sliding friction acts. When the wiping is repeatedly performed, the water-repellent film on the convex portion is worn faster than the bottom surface of the concave portion. Therefore, as illustrated in FIG. 6B, the concave portion 27 that functions as an air reservoir disappears at an early stage, the period during which the initial water-repellent performance can be maintained is shortened, and the effective life of the inkjet head is shortened.

Figure 5A:
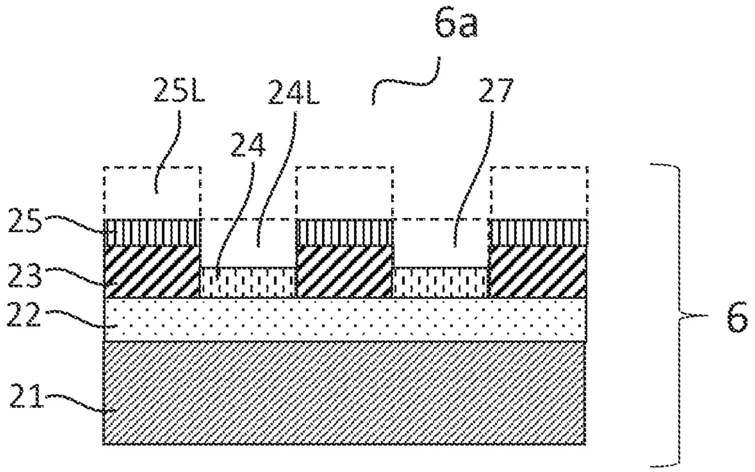
FIG. 5A is a schematic cross-sectional view of the orifice plate according to the exemplary embodiment after the cleaning operation using the wiper.
Figure 5B:
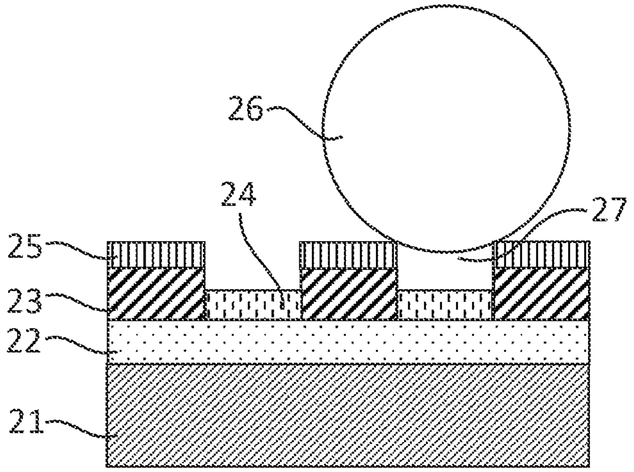
FIG. 5B is a view illustrating a state in which a concave portion serving as an air reservoir is maintained in the orifice plate according to the exemplary embodiment even after the cleaning operation using the wiper.

On the other hand, in the present exemplary embodiment, as described above, since the second water-repellent material 25 on which a larger resistance force acts is formed more densely than the first water-repellent material 24, there is no large difference in the speeds at which the second water-repellent material 25 and the first water-repellent material 24 are worn. FIG. 5A schematically illustrates a cross section of the orifice surface 6*a* of the present exemplary embodiment after the cleaning operation is repeatedly performed. The portion consumed (worn) by sliding is indicated by a dotted line, and the portion where the first water-repellent material 24 is worn is 24L and the portion where the second water-repellent material 25 is worn is 25L. Since the heights of 24L and 25L are substantially equal to each other, as illustrated in FIG. 5B, even when the water-repellent film is worn by wiping, the concave portion 27 that functions as an air reservoir can be maintained for a long period of time. It can be said that the difference in height between the first water-repellent material 24 and the second water-repellent material 25 after sliding on the water-repellent surface of the orifice plate (water-repellent member) with an elastic member is kept substantially equal to the height of the projection 23. Alternatively, it can be said that the speeds at which the first water-repellent material 24 and the second water-repellent material 25 are worn when the elastic member slides on the water repellent surface of the orifice plate (water-repellent member) is substantially equal to each other.

As described above, in the orifice plate (water-repellent member) of the present exemplary embodiment, an imbalance of the consumption of the water-repellent film generated when cleaning is performed using the wiper, that is, a difference in consumption rate between the convex portion and the concave portion is improved, such that a high water-repellent performance can be maintained for a long period of time.

EXAMPLES

Hereinafter, specific examples and comparative examples will be described.

Example 1

A water-repellent film including a base and containing perfluoropolyether was formed on a silicon substrate in the following procedure. First, a SiC film doped with oxygen was formed on a silicon substrate using an RF sputtering apparatus. A pressure during film formation was $3\times10^{-1}$ Pa, an argon flow rate was 10 sccm, and an oxygen flow rate was 1 sccm. A target used was SiC of φ3 inches, a distance between the target and the substrate was 30 mm, an input power was 150 W, and a film formation time was 60 seconds.

Next, $SiO_2$ was formed on the film by RF sputtering using a $SiO_2$ target. A pressure during film formation was $3\times10^{-1}$ Pa, an argon flow rate was 10 sccm, an oxygen flow rate was 5 sccm, an input power was 30 W, and island-shaped $SiO_2$ (minute projection) was formed for a film formation time of 120 seconds. As such, a SiC layer and the minute projections of $SiO_2$ having a higher oxygen content concentration than the SiC layer were formed, and an uneven structure serving as a base when the water-repellent film was formed was formed.

Next, a silicon wafer on which the base was formed was taken out from the sputtering apparatus, and a water-repellent film containing perfluoropolyether was formed by a vacuum deposition method. As a water-repellent film material, SURFCLEAR300 manufactured by Canon Optron, Inc. having a skeleton of Structural Formula (2) was used, and a film was formed at a current of 200 A for 1 minute by a resistance heating method. The substrate was not heated, no gas was introduced, and vapor deposition was performed when a degree of vacuum reached $3\times10^{-3}$ Pa. As such, a water-repellent film formed of perfluoropolyether was formed on an uneven base in which minute projections had a higher oxygen concentration than a flat portion, and a water-repellent member of Example 1 was produced.

The substrate (water-repellent member) on which the water-repellent film was formed was subjected to cross-sectional thin processing with an FIB-SEM to prepare an analysis sample. A film thickness and a composition of the sample were confirmed using TEM-EDS (energy dispersive X-ray analysis). The analysis was performed at an acceleration voltage of 150 KV using an HD-2300 ultra-thin film evaluation apparatus manufactured by Hitachi High-Technologies Corporation and EDAX manufactured by AMETEK Inc. As a result, a thickness of the film containing SiC as a main component in the lowermost layer was 50 nm, and an oxygen content was 8 at %. $SiO_2$ formed on the film was a discontinuous island form (minute projection), and a thickness of the portion was 7 nm, and an oxygen content was 63 at %. A thickness of the water-repellent film formed on the base was about 20 nm.

A wipe sliding test for simulating cleaning in an inkjet head was performed on the water-repellent member, and a static contact angle was measured using pure water before and after the wipe sliding test. The wiper used in the sliding test was a paper file having a roughness of #3000, a load was 400 g, and the number of sliding times was 6,000. As a result, it was confirmed that the contact angle was 110° both before and after sliding, and the water-repellent performance was maintained without deterioration due to sliding.

Comparative Example 1

For comparison, a water-repellent film was formed on a base having no oxygen concentration distribution by the following method. First, a $SiO_2$ film was formed on a silicon substrate using a $SiO_2$ target while oxygen was introduced by sputtering using an RF power supply. A pressure during film formation was $3\times10^{-1}$ Pa, an argon flow rate was 10 sccm, an oxygen flow rate was 5 sccm, an input power was 30 W, and a film formation time was 900 seconds.

Next, island-shaped $SiO_2$ (minute projection) was formed by vacuum deposition with electron beam (EB) heating. At this time, oxygen was introduced into a chamber, a degree of vacuum was $3\times10^{-2}$ Pa, a film formation rate was 1 Å/s, and a shutter opening time was 70 seconds. As such, island-shaped $SiO_2$ (minute projection) having an oxygen concentration substantially equal to that of the $SiO_2$ film was formed on the $SiO_2$ film formed by RF sputtering.

Next, in the same manner as that of Example 1, a water-repellent film formed of perfluoropolyether was formed by a vacuum deposition method. As a water-repellent film material, SURFCLEAR300 manufactured by Canon Optron, Inc. having a skeleton of Structural Formula (2) was used, and a film was formed at a current of 200 A for 1 minute by a resistance heating method. The substrate was not heated, no gas was introduced, and vapor deposition was performed when a degree of vacuum reached $3\times10^{-3}$ Pa. As such, a water-repellent film formed of perfluoropolyether was formed on an uneven base in which oxygen concentrations of a convex portion and a concave portion were equal to each other, and a water-repellent member of Comparative Example 1 was produced.

Using Comparative Example 1 in which the water-repellent film was formed, an analysis sample was prepared in the same manner as that of Example 1, and analysis was performed in the same manner. As a result, a thickness of the sputtered $SiO_2$ film of the lowermost layer was 50 nm, and an oxygen content was 63 at %. $SiO_2$ formed on the film by vapor deposition was a discontinuous island form (minute projection), and a thickness thereof was 7 nm, and an oxygen content was 63 at %. In addition, a thickness of the water-repellent film was 20 nm.

The water-repellent member of Comparative Example 1 was subjected to a wipe sliding test evaluation under the same conditions as those of Example 1. As a result, a contact angle before sliding was 110°, whereas a contact angle after 6,000 times of sliding was reduced to 80°, and it was confirmed that the initial water-repellent performance could not be maintained.

Example 2

A water-repellent film including a base and containing perfluoropolyether was formed on a silicon substrate in the following procedure. First, a SiO film was formed on the silicon substrate using a vacuum deposition apparatus. A granular vapor deposition material was used, a current was set to 150 A for resistance heating, and a film formation time was 2 minutes. At this time, oxygen was not introduced, and vapor deposition was performed at a degree of vacuum of $1\times10^{-3}$ Pa.

Next, island-shaped $SiO_2$ (minute projection) was subsequently formed by electron beam heating by a vacuum deposition method. At this time, oxygen was introduced into a chamber, a degree of vacuum was $3\times10^{-2}$ Pa, a film formation rate was 1 Å/s, and a shutter opening time was 70 seconds. As such, a SiO film by vacuum deposition and the minute projections of $SiO_2$ having a higher oxygen content concentration than the SiO film were formed, and an uneven structure serving as a base when the water-repellent film was formed was formed.

Next, in the same manner as that of Example 1, a water-repellent film formed of perfluoropolyether was formed by a vacuum deposition method. As a water-repellent film material, SURFCLEAR300 manufactured by Canon Optron, Inc. having a skeleton of Structural Formula (2) was used, and a film was formed at a current of 200 A for 1 minute by a resistance heating method. The substrate was not heated, no gas was introduced, and vapor deposition was performed when a degree of vacuum reached $3\times10^{-3}$ Pa. As such, a water-repellent film formed of perfluoropolyether was formed on an uneven base in which minute projections had a higher oxygen concentration than a flat portion, and a water-repellent member of Example 2 was produced.

Using the water-repellent member of Example 2 on which the water-repellent film was formed, an analysis sample was prepared in the same manner as that of Example 1, and analysis was performed in the same manner. As a result, a thickness of the SiO film of the underlayer was 50 nm, and an oxygen content was 38 at %. $SiO_2$ formed on the film by vacuum deposition was a discontinuous island form (minute projection), and a thickness thereof was 7 nm, and an oxygen content was 64 at %. A thickness of the water-repellent film formed on the base was about 20 nm.

The water-repellent member of Example 2 was subjected to a wipe sliding test evaluation under the same conditions as those of Example 1. As a result, it was confirmed that the contact angle was 108° both before and after sliding, and the water-repellent performance was maintained without deterioration due to sliding.

Example 3

A water-repellent film including a base and containing perfluoropolyether was formed on a silicon substrate in the following procedure. First, a SiO film was formed on the silicon substrate using a vacuum deposition apparatus. A granular vapor deposition material was used, a current was set to 150 A for resistance heating, and a film formation time was 2 minutes. At this time, oxygen was not introduced, and vapor deposition was performed at a degree of vacuum of $1\times10^{-3}$ Pa.

Next, island-shaped $SiO_2$ (minute projection) was formed by electron beam heating by a vacuum deposition method in the same manner as that of Example 2. At this time, oxygen was introduced into a chamber, a degree of vacuum was $3\times10^{-2}$ Pa, a film formation rate was 1 Å/s, and a shutter opening time was 70 seconds. As such, a SiO film by vacuum deposition and the minute projections of $SiO_2$ having a higher oxygen content concentration than the SiO film were formed, and an uneven structure serving as a base when the water-repellent film was formed was formed.

Next, a water-repellent film formed of perfluoropolyether was formed by a vacuum deposition method. Unlike Example 1, as a material of the water-repellent film, OPTOOL DSX-E having a skeleton of Structural Formula (1) manufactured by Daikin Industries, Ltd. was used. A film was formed by a resistance heating method using a cup-shaped molybdenum boat at a current of 160 A for a film formation time of 1 minute. The substrate was not heated, no gas was introduced, and a film was formed at a degree of vacuum of $3\times10^{-3}$ Pa.

Using the water-repellent member of Example 2 on which the water-repellent film was formed, an analysis sample was prepared in the same manner as that of Example 1, and analysis was performed in the same manner. As a result, a thickness of the SiO film of the underlayer was 50 nm, and an oxygen content was 48 at %. $SiO_2$ formed on the film by vacuum deposition was a discontinuous island form (minute projection), and a thickness thereof was 7 nm, and an oxygen content was 64 at %. A thickness of the water-repellent film formed on the base was about 15 nm.

The water-repellent member of Example 3 was subjected to a wipe sliding test evaluation under the same conditions as those of Example 1. As a result, it was confirmed that the contact angle was 109° both before and after sliding, and the water-repellent performance was maintained without deterioration due to sliding.

Example 4

The inkjet head illustrated in FIG. 1 was prepared using an orifice plate subjected to the same water repellent treatment as that of Example 2. Note that in consideration of mass productivity, each process described below is performed in a wafer state to integrally form a plurality of inkjet heads, a water-repellent film is formed, and then dicing is performed to separate the individual inkjet heads, thereby forming the form of the inkjet head illustrated in FIG. 1.

First, a first flow path substrate 1 in which a groove serving as an ink flow path was formed in a silicon substrate and a second flow path substrate 2 in which a groove serving as an ink flow path was formed in a silicon substrate were produced by RIE processing using photolithography. Note that an ejection energy generating element 5 formed of TaSiN, an electrode 7 formed of Au, a silicon protective film (not illustrated) formed of TiO, and the like are formed on the silicon substrate before or after groove processing. In addition, a groove serving as an ink flow path was formed in another silicon substrate by RIE processing using photolithography, and an ejection port 4 was formed by Bosch processing, thereby producing an orifice plate 6.

The first flow path substrate 1, the second flow path substrate 2, and the orifice plate 6 thus produced were bonded together with an adhesive to form an integrated form of a plurality of inkjet heads. A benzocyclobutene solution was used as the adhesive, and bonding was performed by a transfer method. These members to which the adhesive was transferred were heated in a vacuum while being aligned by a bonding alignment apparatus to perform bonding. After the bonding was completed and cooling was performed, the members were taken out from the apparatus, and a heat treatment was performed in an oven in a nitrogen atmosphere to cure the adhesive.

Finally, a base and a water-repellent film were formed on the orifice surface **6*a* in the same manner as that of Example 2. That is, first, a SiO film was formed on the silicon substrate serving as the orifice surface 6*a*** using a vacuum deposition apparatus. A granular vapor deposition material was used, a current was set to 150 A for resistance heating, and a film formation time was 2 minutes. At this time, oxygen was not introduced, and vapor deposition was performed at a degree of vacuum of $1\times10^{-3}$ Pa.

Next, island-shaped $SiO_2$ (minute projection) was formed by electron beam heating by a vacuum deposition method.

At this time, oxygen was introduced into a chamber, a degree of vacuum was $3\times10^{-2}$ Pa, a film formation rate was 1 Å/s, and a shutter opening time was 70 seconds. As such, a SiO film by vacuum deposition and the minute projections of $SiO_2$ having a higher oxygen content concentration than the SiO film were formed, and an uneven structure serving as a base when the water-repellent film was formed was formed.

Next, a water-repellent film formed of perfluoropolyether was formed by a vacuum deposition method. As a water-repellent film material, SURFCLEAR300 manufactured by Canon Optron, Inc. having a skeleton of Structural Formula (2) was used, and a film was formed at a current of 200 A for 1 minute by a resistance heating method. The substrate was not heated, no gas was introduced, and vapor deposition was performed when a degree of vacuum reached $3\times10^{-3}$ Pa. As such, a water-repellent film formed of perfluoropolyether was formed on an uneven base in which an oxygen concentration of the minute projections was higher than that of the flat portion.

Thereafter, the inkjet head illustrated in FIG. 1 was completed by dicing and individual separation. When the inkjet head of Example 4 was mounted on an inkjet recording apparatus including a wiping mechanism and was subjected to a practical test, it was possible to record a high-quality image for a long period of time as compared with an apparatus on which an inkjet head according to the related art was mounted.

Although not shown in the examples, when a water-repellent film material having a skeleton of Structural Formula (3) or Structural Formula (4) is used, for example, a water-repellent film formed of perfluoropolyether may be formed using FG-5083SH manufactured by Fluoro technology Co., Ltd.

In addition, in Example 4, a unit corresponding to the plurality of inkjet heads is integrally formed by bonding the wafers, and the individual inkjet heads are separated by dicing after the water-repellent film is applied, but the manufacturing method is not limited thereto. For example, the flow path substrate or the orifice plate may be prepared and assembled as a component for each single inkjet head. In addition, instead of assembling the inkjet head and then applying the water-repellent film, the inkjet head may be assembled after applying the water-repellent film to the orifice plate in advance.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-2834, filed Jan. 12, 2022, which is hereby incorporated by reference herein in its entirety.

What is claimed is:

1. A water-repellent member comprising:

a substrate;

a base layer formed on the substrate;

projections dispersedly arranged on the base layer;

a first water-repellent material provided on the base layer in contact with the base layer; and a second water-repellent material provided on the projections in contact with the projections, wherein the first water-repellent material and the second water-repellent material include perfluoropolyether compounds, and an oxygen concentration of the base layer is lower than an oxygen concentration of the projections.

2. The water-repellent member according to claim 1, wherein the oxygen concentration of the base layer is 10 at % or more and 50 at % or less in energy dispersive X-ray analysis.

3. The water-repellent member according to claim 1, wherein the oxygen concentration of the projections is higher than the oxygen concentration of the base layer by 10 at % or more in energy dispersive X-ray analysis.

4. The water-repellent member according to claim 1, wherein the perfluoropolyether compound has at least one of repeating structures represented by structural formulas (1) to (4):

$$-\!\!\left[CF_2-CF_2-CF_2-O\right]_{n1}\!\!- \quad (1)$$

(2)

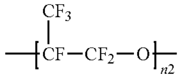

$$-\!\!\left[CF_2-O\right]_{n3}\!\!- \quad (3)$$

$$-\!\!\left[CF_2-CF_2-O\right]_{n4}\!\!- \quad (4)$$

5. The water-repellent member according to claim 1, wherein a density of the first water-repellent material is smaller than a density of the second water-repellent material.

6. The water-repellent member according to claim 1, wherein a difference in height between the first water-repellent material and the second water-repellent material after sliding on a water-repellent surface of the water-repellent member with an elastic member is substantially equal to a height of the projections.

7. The water-repellent member according to claim 1, wherein speeds at which the first water-repellent material and the second water-repellent material are worn during sliding on a water-repellent surface of the water-repellent member with an elastic member are substantially equal to each other.

8. An inkjet head comprising:

an orifice plate provided with an ejection port, wherein the orifice plate includes: a substrate; a base layer formed on the substrate; projections dispersedly arranged on the base layer; a first water-repellent material provided on the base layer in contact with the base layer; and a second water-repellent material provided on the projections in contact with the projections, the first water-repellent material and the second water-repellent material include perfluoropolyether compounds, and an oxygen concentration of the base layer is lower than an oxygen concentration of the projections.

9. The inkjet head according to claim 8, wherein the oxygen concentration of the base layer is 10 at % or more and 50 at % or less in energy dispersive X-ray analysis.

10. The inkjet head according to claim 8, wherein the oxygen concentration of the projections is higher than the oxygen concentration of the base layer by 10 at % or more in energy dispersive X-ray analysis.

11. The inkjet head according to claim 8, wherein the perfluoropolyether compound has at least one of repeating structures represented by structural formulas (1) to (4):

$$-\left[CF_2-CF_2-CF_2-O\right]_{n1}- \quad (1)$$

$$-\left[\overset{CF_3}{\overset{|}{C}}F-CF_2-O\right]_{n2}- \quad (2)$$

$$-\left[CF_2-O\right]_{n3}- \quad (3)$$

$$-\left[CF_2-CF_2-O\right]_{n4}- \quad (4)$$

12. The inkjet head according to claim 8, wherein a density of the first water-repellent material is smaller than a density of the second water-repellent material.

13. The inkjet head according to claim 8, wherein a difference in height between the first water-repellent material and the second water-repellent material after sliding with a wiper is substantially equal to a height of the projections.

14. The inkjet head according to claim 8, wherein speeds at which the first water-repellent material and the second water-repellent material are worn during sliding with a wiper are substantially equal to each other.

15. A method of manufacturing a water-repellent member, the method comprising:

forming a base layer on a substrate;

dispersedly arranging projections having an oxygen concentration higher than that of the base layer on the base layer; and forming a water-repellent film that contains a perfluoropolyether compound and is in contact with the base layer and the projections.

16. The according to claim 15, wherein the oxygen concentration of the base layer is 10 at % or more and 50 at % or less in energy dispersive X-ray analysis.

17. The method according to claim 15, wherein the oxygen concentration of the projections is higher than the oxygen concentration of the base layer by 10 at % or more in energy dispersive X-ray analysis.

18. The method according to claim 15, wherein the perfluoropolyether compound has at least one of repeating structures represented by structural formulas (1) to (4):

$$-\left[CF_2-CF_2-CF_2-O\right]_{n1}- \quad (1)$$

$$-\left[\overset{CF_3}{\overset{|}{C}}F-CF_2-O\right]_{n2}- \quad (2)$$

$$-\left[CF_2-O\right]_{n3}- \quad (3)$$

$$-\left[CF_2-CF_2-O\right]_{n4}-. \quad (4)$$

19. A method of manufacturing an inkjet head, the method comprising manufacturing an orifice plate by the method according to claim 15.

* * * * *